United States Patent [19]

Wang et al.

[11] Patent Number: 4,960,760
[45] Date of Patent: Oct. 2, 1990

[54] CONTACTLESS MASS TRANSFER SYSTEM

[75] Inventors: Xingwu Wang; James D. Royston, both of Alfred, N.Y.

[73] Assignee: Howard J. Greenwald, Rochester, N.Y.

[21] Appl. No.: 392,199

[22] Filed: Aug. 10, 1989

[51] Int. Cl.$^5$ .............................................. F41F 1/02
[52] U.S. Cl. .................................... 505/1; 89/8; 104/138.1; 104/286; 124/3; 505/307
[58] Field of Search .................... 89/8; 104/281, 282, 104/284, 285, 286, 138.1; 124/3; 310/14; 501/902, 903, 904, 907

[56] References Cited

U.S. PATENT DOCUMENTS

| | | | |
|---|---|---|---|
| 4,273,054 | 6/1981 | Yamashita et al. | 104/281 |
| 4,796,511 | 1/1989 | Eyssa | 89/8 |
| 4,797,386 | 1/1989 | Gyorgy et al. | 310/90.5 |
| 4,813,332 | 3/1989 | Jasper | 89/8 |
| 4,817,494 | 4/1989 | Cowan | 89/8 |
| 4,820,688 | 4/1989 | Jasper | 505/855 |
| 4,825,111 | 4/1989 | Hommes et al. | 310/12 |
| 4,833,965 | 5/1989 | Jasper | 89/8 |

FOREIGN PATENT DOCUMENTS

| | | |
|---|---|---|
| 0274405 | 7/1988 | European Pat. Off. . |
| 2576406 | 7/1989 | France . |
| 00125826 | 1/1988 | Japan . |
| 63-266743 | 11/1988 | Japan . |
| 1023098 | 1/1989 | Japan ..................................... 124/3 |
| 64-52368 | 2/1989 | Japan . |

OTHER PUBLICATIONS

E. H. Brandt, "Friction in Levitated Superconductors" Applied Physics Lett. 53(16), Oct. 17, 1988, pp. 1554-1556.
S. C. Rashleigh & R. A. Marshall, "Electromagnetic Acceleration of Macroparticles to High Velocities", J. Appl. Phys. 49 (4), Apr. 1978, pp. 2540-2542.
E. Igenbergs et al., "The TUM/LRT Electromagnetic Launchers", IEEE Transactions on Magnetics, vol. Mag-22, No. 6, Nov. 1986, pp. 1536-1541.
Shu Usuba et al., "Development of Railgun Accelerator at NCLI", IEEE Transactions on Magnetics, vol. Mag-22, No. 6, Nov. 1986, pp. 1785-1789.
J. L. Upshaw, "Testing of Coaxial Railguns in High Vacuum", IEEE Transactions on Magnetics, vol. Mag-22, No. 6, Nov. 1986, pp. 1779-1784.
M. A. Hilal, "Magnetic Advanced Hybrid (MAH) Gun", IEEE Transactions on Magnetics, vol. 25, No. 1, Jan., 1989, pp. 228-231.
Hans Mark, "Electromagnetic Launch Technology: The Promise and the Problems", IEEE Transactions on Magnetics, vol. 25, No. 1, Jan. 1989, pp. 17-19.
John R. Hull, "Application of Superconducting Technology to Earth-To-Orbit Electromagnetic Launch Systems", IEEE Transactions on Magnetics, vol. 25, No. 1, Jan. 1989, pp. 243-248.
Alv Egeland, "Birkeland's Electromagnetic Gun: A Historical Review" IEEE Transactions on Plasma Science, vol. 17, No. 2, Apr., 1989, pp. 73-82.
David P. Bauer et al., "In-Bore Railgun Projectile Velocity", IEEE Transactions on Magnetics, vol. Mag-22, No. 6, Nov. 1986, pp. 1395-1398.
M. Cowan et al., "The Reconnection Gun", IEEE Transactions on Magnetics, vol. Mag-22, No. 6, Nov. 1986, pp. 1429-1433.

(List continued on next page.)

*Primary Examiner*—Stephen C. Bentley
*Attorney, Agent, or Firm*—Howard J. Greenwald

[57] ABSTRACT

An apparatus designed to move mass without contact is described. The apparatus contains a chamber which is formed by alternating sections of superconducting material and electromagnetic coils. The chamber is cooled to below the critical temperature of the superconducting material, and a magnetic object is disposed in the center of the chamber. A series of coils along the chamber are sequentially energized by direct current to form electromagnetic fields. The sequence and direction of these fields causes the movement of the magnetized object within the chamber.

20 Claims, 6 Drawing Sheets

OTHER PUBLICATIONS

E. M. W. Leung et al., "Using A Small Hybrid Pulse Power Transformer Unit As Component of a High--Current Opening Switch for a Railgun", IEEE Transactions on Magnetics, vol. 25, No. 2 Mar., 1989, pp. 1779–1782.

C. G. Homan, "Superconducting Augmented Rail Gun (SARG)", IEEE Transactions on Magnetics, vol. Mag-22, no. 6, Nov. 1986, pp. 1527–1531.

C. G. Homan et al., "Evaluation of Superconducting Augmentation on Rail Gun Systems", IEEE Transactions on Magnetics, vol. Mag-20, No. 2, Mar. 1984, pp. 366–369.

Shu Usuba, "Railgun Experiment At Tokyo Institute of Technology", IEEE Transactions on Magnetics, vol. Mag-22, No. 6, Nov. 1986, pp. 1790–1792.

C. G. Homan, "Superconducting Augmented Rail Gun (SARG) Development", International Conference on Megagauss Magnetic Field Generation and Related Topics, 4th, 1986, pp. 829–837.

CONTACTLESS MASS TRANSFER SYSTEM

FIELD OF THE INVENTION

A contactless mass transfer system which contains a container comprised of superconductive material, means for cooling said container, and means for creating an electromagetic field at certain portions of the container.

BACKGROUND OF THE INVENTION

Electromagnetic railguns are well known to those skilled in the art. Thus, for example, U.S. Pat. Nos. 4,813,332 and 4,833,965 of Jasper disclose electromagnetic railguns. Although the Japser devices are an improvement upon prior art railgun devices, they are still relatively inefficient. Because of the contact surfaces involved in said devices (the rails), at least about 70 percent of the energy provided to such system to move an object is lost as contact friction.

U.S. Pat. No. 4,797,386 of Gygorgy et al. discloses a device utilizing high critical temperature superconductors in which a frictionless bearing is formed. Although the patentees claim that their device maintains stability in separation distance between the superconductor member and the magnetized member, the device does not disclose a means of imparting linear motion to the magnetized member while still maintaining its stability.

U.S. Pat. No. 4,796,511 of Eyssa discloses an electromagnetic projectile launcher which operates on a railgun principle and, thus, loses a substantial amount of energy.

It is an object of this invention to provide a mass transfer system which is at least about 80 percent efficient.

It is yet another object of this invention to provide a mass transfer system in which a projectile is moved through a cavity without making frictional contact with the walls defining said cavity.

It is yet another object of this invention to provide a mass transfer system in which, while a projectile is being moved through a cavity, it is maintained at a substantially constant height within said cavity.

It is yet another object of this invention to provide a process for preparing a pressed body with a symmetrical shape which will have substantially no internal deformations.

It is yet another object of this invention to provide a mass transfer system in which the speed and direction of the object being transferred can be controlled.

It is yet another object of this invention to provide a demonstration kit which illustrates the scientific principles of this invention.

SUMMARY OF THE INVENTION

In accordance with this invention, there is provided a contactless mass transfer system comprising a symmetrical chamber. The symmetrical chamber contains alternating portions of superconductive material and electromagnetic coils. Means are provided for sequentially creating and/or collapsing electromagnetic fields around the coils to facilitate the movement of a magnetic projectile through the chamber.

BRIEF DESCRIPTION OF THE DRAWINGS

The present invention will be more fully understood by reference to the following detailed description thereof, when read in conjunction with the attached drawings, wherein like reference numerals refer to like elements and wherein.

DESCRIPTION OF THE PREFERRED EMBODIMENTS

Figure 1:
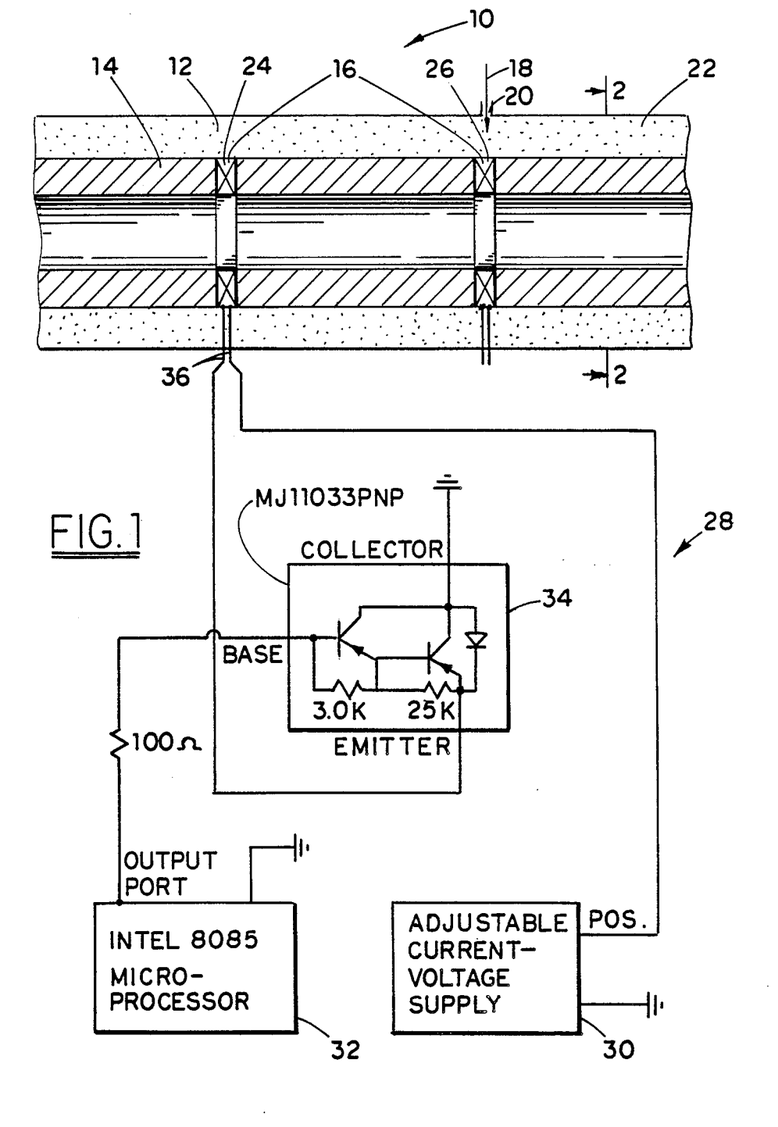
FIG. 1 is a cross-sectional view of one preferred embodiment of the invention.

FIG. 1 illustrates one of the preferred embodiments of applicants' system. Referring to FIG. 1, contactless mass transfer system 10 is shown. Mass transfer system 10 is comprised of means for cooling superconducting material 12, superconducting material 14, and means for generating an electromagnetic field 16. This system 10 may be used to accelerate a magnetized object (not shown).

Any means for cooling superconducting material 12 below its critical temperature may be used. As is known to those skilled in the art, critical temperature is the temperature at which superconductivity occurs in a material. It is preferred that this temperature be no lower than about 85 degrees Kelvin.

Any of the cooling means 12 known to those skilled in the art may be used. Thus, for example, one may use the cooling means described in U.S. Pat. No. 4,813,332 of Jasper, the disclosure of which is hereby incorporated by reference into this specification. By way of illustration and not limitation, suitable cooling means include liquid nitrogen, cryogenic refrigerators, compressed gas cryogenic refrigerators, and the like.

In one preferred embodiment, illustrated in FIG. 1, liquid nitrogen is fed via line 18 through inlet 20, thereby filling chamber 22. In this embodiment, chamber 22 is concentric with superconducting material 14.

In the preferred embodiment of FIG. 1, it is preferred that the cooling chamber 22 be substantially contiguous with superconducting material 14 in order to maximize cooling efficiency. It is preferred that at least about 90 percent of the exterior surface of superconducting material 14 be in contact with a surface of cooling chamber 22. In this preferred embodiment, both the superconducting material 14 and chamber 22 have a substantially cylindrical cross section, and substantially the entire outer perimeter of superconductor 14 is in contact with at least one portion of the interior perimeter of cooling chamber 22.

Cooling means 12, in addition to cooling the superconductor below its critical temperature, also preferably should cool the means 16 for generating an electromagnetic field to a temperature which may be at substantially the same temperature as the superconductor.

The superconducting material used in this invention has a critical temperature greater than about 77 degrees Kelvin and, preferably, greater than about 85 degrees Kelvin.

One class of superconductors which may be used are "Type II" superconductors with a critical temperature greater than about 77 degrees Kelvin. As is known to those skilled in the art, Type II superconductors are characterized by first and second values of critical field, $H_{c,1}$ and $H_{c,2}$—in which field penetration first occurs at the lowest value to result in pinned fields which persist to much higher $H_{c,2}$ levels. See, e.g., U.S. Pat. No. 4,797,386 of Gygorgy et al. and M. Tinkham, Introduction to Superconductivity, Chapter 5, page 143 (McGraw-Hill, Inc., 1975), the disclosures of which are hereby incorporated by reference into this specification.

In an especially preferred embodiment, the superconductor material 14 has a critical temperature of at least about 77 degrees Kelvin, is a Type II material, and is a ceramic material.

In one preferred embodiment, the superconductor material used in the invention has specifed $H_{c,1}$ and $H_{c,2}$ properties. The $H_{c,1}$ of these preferred materials is from about 10 to about 100 Gauss. The $H_{c,2}$ of these materials is from about 30 to about 100 Tesla. The second value of the critical field of the superconductor material is generally at least about 10,000 times as great as the first value of the critical field of the material.

High-temperature superconductors which may be used in the invention are described in an article by A. W. Sleight entitled "Chemistry of High-Temperature Superconductors," Science, Volume 242 (Dec. 16, 1988) at pages 1519–1527, the disclosure of which is hereby incorporated by reference into this specification.

One preferred class of superconductors, described on pages 1522–1523 of the Sleight article, is of the formula R Ba$_2$Cu$_3$O$_{6+x}$, wherein x is from about 0.5 to about 1.0 and R is a rare earth element selected from the group consisting of yttrium, gadolinium, lanthanum, europium, holmnium, and the like. In one preferred embodiment, R is yttrium.

Another preferred class of superconducting materials is of the formula (AO)$_m$M$_2$Ca$_{n-1}$Cu$_n$O$_{2n+2}$, wherein A is selected from the group consisting of thallium, bismuth, and mixtures of bismuth and lead, m is from about 1 to about 2 (and generally is 1 or 2 when A is thallium and is 2 when A is bismuth), M is selected from the group consisting of barium and strontium, and n is at least 1. In one preferred embodiment, illustrated on page 1523 of the Sleight article, A is thallium, m is 2, M is barium, and n is 3; this compositon has a critical temperature of about 122 degrees Kelvin.

The superconductor used in this invention, when tested in accordance with a specified test, will have a specified levitation height. As is known to those skilled in the art, superconducting materials exhibit the "Meissner effect," which is the exclusion of a magnetic field from a superconductor. See, e.g., M. Tinkham's "Introduction to Superconductivity," supra.

As is known to those skilled in the art, levitation height may be calculated from the following Hellman equation:

$$d = (MH_{c,1}L/PDg)^{\frac{1}{2}},$$

wherein d is the levitation height, as measured from the center of the levitating object to the top surface of the superconductor, in centimeters; M is the magnetic moment of the levitating object, in gauss; $H_{c,1}$ is the first critical field value, as discussed hereinabove; L is the thickness of the superconducting material, P is pi, and is equal to about 3.1416, D is the density of the levitating object, and g is the gravitational constant, and is equal to about 9.81 meters per second per second. Reference may be had to an article by F. Hellman et al. entitled "Levitation of a magnet over a flat type II superconductor" (Journal of Applied Physics, 63 (2), Jan. 15, 1988), the disclosure of which is hereby incorporated by reference into this specification.

In the levitation height test used, which determines the levitation height obtained by a specified magnet with the superconductor material to be tested, one uses a specified rare earth cobalt magnet (obtained from the Edmund Scientific Company) which had a magnetic moment of 8200 gauss, a mass of 0.54 grams, a length of 0.89 centimeters, a width of 0.48 centimeters, and a height of 0.34 centimters is used. In this test, the superconducting material is formed into a flat disc with a thickness of about 0.5 centimeter and a diameter of about 3 centimeters.

The levitation height obtained with the superconductor flat disc which is tested in accordance with this procedure is preferably at least about 0.7 centimeters and, in an even more prefered embodiment, is at least 1.6 centimeters.

If the procedure is changed to vary, e.g., the thickness of the superconducting disc, the density of the levitating object, or other parameters described in the aforementioned formula, different levitation heights will result with the same superconductive material. Thus, two levitation height parameters are used to define applicants' system. One, the levitation height obtained with the superconductor material in the form of the specified flat disc, is determined in accordance with the aformentioned test. The second, the levitation height actually obtained in applicants' mass transfer system (which often will have superconductors with dimensions different than the disc used in the first test), may be estimated by the aformentioned Hellman equation; however, the precise levitation height must be measured during operation of the system. Such measurement may be made by cooling the superconducting chamber to a temperature below the critical temperature of the superconducting material in the chamber, inserting the magnetized object in the center of the chamber, and measuring the distance from the inner surface of the chamber to the center of the magnetized object being levitated. In general, in applicants' system, the levitation height of the system must be at least about 0.1 centimeters.

When reference is made to the levitation height hereafter, it will be understood that the levitation height of the system is being discussed and that, unlike the first levitation height parameter (which relates a height achieved in an open system), the height is obtained in a symmetrical chamber.

In the remainder of this specification, the first levitation height parameter will be referred to as the levitation height of the superconductor; and the second levitation height parameter will be referred to as the levitation height of the system.

In one embodiment, the levitation height of the system may be increased by doping the superconductor material with silver. In general, from about 0.1 to about 10 weight percent (by total weight of superconducting material and silver) of silver or silver source is added. One may add pure, elemental silver. It is preferred, however, to add the silver in the form of a silver compound such as, silver oxide, silver dioxide, and the like. The addition of the silver dopant to the superconducting material is believed to increase its critical current; see, e.g., Tinkam's "Introduction to Superconductivity," supra.

In one preferred embodiment, the superconducting material is configured so as to maximize the stability of the projectile levitating within it. The stability of magnets levitated above superconductors depends upon several factors such as the flux penetration and the pinning effects. See, e.g., an article by L. C. Davis et al. entitled "Stability of magnets levitated above superconductors," Journal of Applied Physics, 64(8), Oct. 15, 1988, the disclosure of which is hereby incorporated by reference into this specification.

The pinning force exerted by the magnetized object upon the superconductive chamber may be estimated by the following formula of Davis:

$$F_D = 5LU_O(H_{max})^3/24J_c,$$

wherein $F_D$ is the pinning force (in Newtons), L is the levitation height of the system (in meters), $U_O$ is the magnetic permeability of free space (in tesla-meters/ampere), $H_{max}$ is the maximum magnetic field (in amperes/meter), and $J_c$ is the critical current of the superconductor material (in amperes/square meter). Reference may be had to L. C. Davis et al.'s "Stability of magnets levitated above superconductors," page 4212, supra.

In one preferred embodiment, in order to maximize stability, a superconducting material 14 is formed into a hollow, symmetrical chamber. As used in this specification, the term symmetrical chamber refers to a chamber whose interior surfaces define a symmetrical shape. Thus, by way of illustration and not limitation, material 14 can be formed in the shape whose interior dimensions define a circular cross section; in this embodiment, the exterior dimensions of the body may define a circular cross section, a square cross-section, an irregular cross-section, and the like. Thus, e.g., material 14 can be formed in a shape whose interior dimensions define a square; the exterior shape of this chamber may be circular, square, or of an irregular shape, etc. Thus, the interior shape of the chamber may be triangular, pentagonal, hexagonal, heptagonal, octagonal, etc.

Two preferred shapes which may be used for the chamber of this invention are shown as elements 14 and 72 in FIGS. 5, 5A, 6A and 6. In these embodiments, it is preferred to control the internal height of the chamber. In the case of the cylinder, such internal height is its internal diameter. In the case of the square, such internal height is the distance between two opposing internal surfaces. With other shapes, the internal height is the distance from the bottom to the top of the shape.

It is preferred, in this embodiment, that half of the internal height of the symmetrical chamber be less than the levitation height of the system, as defined above.

In one preferred embodiment, the superconductor used in the invention is of the formula $Y\,Ba_2Cu_3O_{7-x}$, the well known 1-2-3 superconducting phase. This superconducting material is prepared by a solid state reaction method. Stoichiometric amounts of yttrium oxide, barium carbonate, and copper oxide are intimately mixed and ground, and the powder is then calcined in a special calcination cycle.

In the preferred calcination cycle used by applicants, the material is first raised from ambient temperature to a temperature of from about 900 to about 960 degrees centigrade at a rate of from about 100 to about 400 degrees centigrade per hour. It is preferred to raise the temperature of the material from ambient temperature to a temperature of from about 910 to about 930 degrees centigrade at a rate of from about 275 to about 325 degrees centigrade per hour. Once the material reaches the temperature of from 900 to 960 degrees centigrade, it is maintained at this temperature for from about 10 to about 15 hours. Thereafter, its temperature is reduced to ambient at a rate of about from about 100 to about 400 degrees per hour.

The cooled calcined material is then ground until substantially all of its particles are smaller than 53 microns, and then the entire calcination/grinding cycle may be repeated one or more times.

It will be apparent to those skilled in the art that other calcination/grinding cycles which improve the homogeneity of the powder batch also may be used.

Without wishing to be bound to any particular theory, applicants believe that the use of the grinding/calcination cycle produces a superconductor with a pure phase. Shaped objects made from material thus processed are less brittle.

Any conventional means may be used to prepare the shaped objects. Thus, for example, one may use the forming processes described in James S. Reed's "Introduction to the Principles of Ceramic Processing," (John Wiley and Sons, Inc., New York, 1988), the disclosure of which is hereby incorporated by reference into this specification.

In one preferred embodiment, the calcined powder is formed into a shaped object by pressing. The pressing techniques described at pages 329-355 of said Reed book may be used. In general, in this embodiment, it is preferred to use a pressing pressure of from about 10 thousand to about 25 thousand pounds per square inch. In a more preferred embodiment, the pressure used is from about 15,000 to about 20,000 pounds per square inch. In general, this pressure is applied to the powder for from at least about 2 minutes and, preferably, from about 4 to about 10 minutes. With the Yttrium-Barium-Copper 1-2-3 calcined powder described above, a pressing time of from about 5 to about 7 minutes and a pressure of about 15,000 p.s.i. is suitable.

The pressed body is then preferably sintered under specified conditions to yield a sintered body with substantially no internal deformations. A unique sintering cycle is utilized for this purpose. During this entire sintering and annealing cycle, the pressed body is maintained under a flowing oxygen-containing gas while being sintered. The oxygen containing gas may be pure oxygen. The oxygen-containing gas preferably is at a pressure of at least about 1 atmosphere, and it is flowed over the pressed shape(s) at a rate of from 0.1 to about 10 cubic centimeters per minute.

It is preferred to raise the temperature of the formed body from ambient to a temperature of from about 920 to about 950 degrees centigrade at a rate of less than about 400 degrees centigrade per hour while the pressed body is under a flowing, oxygen-containing gas. It is more preferred to raise the temperature of the body from ambient to a temperature of from about 920 to about 930 degrees centigrade at a rate of less than about 300 degrees centigrade per hour.

Once the pressed body has reached the sintering temperature, it is maintained at this temperature under flowing oxygen-containing gas for at least about 20 hours. It is preferred to maintain the body at this temperature for from about 22 to about 26 hours. In one embodiment, the pressed body is maintained under these conditions for about 24 hours.

After the pressed body has been sintered under the aforementioned conditions, it is then cooled to a temperature of from about 600 to about 660 degrees centigrade at a rate of less than about 100 degrees centigrade per hour while under said flowing oxygen-containing gas. In one preferred embodiment, the sintered body is cooled to a temperature of from about 640 to about 660 degrees centigrade at a rate of from about 90 to about 100 degrees centigrade per hour.

After the sintered body has been cooled to a temperature of from about 600 to about 660 degrees centigrade, it is annealed at this temperature while under said flowing oxygen-containing gas for at least about 5 hours and, preferably, from about 5.5 to about 7.5 hours.

In the embodiment involving the 1-2-3 superconducting phase of yttrium/barium/copper, described above, the superconducting orthorhomic phase $Y_1Ba_2Cu_3O_{7-x}$ (x=0—0.5) is formed during this annealing process. In one embodiment, during the annealing process, samples of the annealed material are periodically withdrawn and subjected to X-ray diffraction analysis to determine the phase purity. When the desired amount and type of the superconducting phase has been formed, the annealing process may be ended.

After the material has been annealed, it is then cooled to ambient temperature; it is preferred, though not essential, that this cooling step occur under flowing oxygen-containing gas. The cooling to ambient temperature occurs at a rate of less than about 300 degrees centigrade per hour.

The apparatus of this invention is comprised of means for generating an electromagnetic field 16. Any of the means for generating such a field may be used in this invention. Thus, for example, one may use a direct current passing through a conductor to generate an electromagnetic field.

In one preferred embodiment, means 16 is comprised of a symmetrical coil whose interior preferably will have substantially the same shape as the shape of the interior of the superconducting chamber; as long as the shape of the interior of the coil is symmetrical, its exterior may (but need not) have a nonsymmetrical shape. Thus, by way of illustration, the interior of the coil may define a circular cross-section and the exterior of the coil may define an irregular cross-section. Thus, in one preferred embodiment, both the interior and exterior portions of the coil define a circular shape. In another preferred embodiment, the interior and exterior surfaces of the coil are both square. See, for example, FIGS. 1, 8, 10, and 11.

It is preferred to use coils in the apparatus of this invention which, regardless of their shape, are substantially symmetrical and have a center line from which all of the interior surfaces of the coil are substantially equidistant. Thus, for example, the coil may be in the shape of a cylinder or a square; and the magnetic projectile will levitate by Meissner effect along about the center line of said coil. One complicating factor in the device of this invention is the effect of gravity. With a substantially symmetrical coil, the forces from the Meissner effect exert an equal effect upon a projectile in the middle of the coil, thereby tending to maintain it in the middle position. However, the force due to gravity, in addition to the Meissner effect, tends to pull the projectile towards the earth; and the combination of all forces tends to pull the projectile from the desired middle position. Thus, it is critical to utilize a superconductive system with a specified levitation height, to have the material in a configuration such that its distance from the projectile does not exceed a certain fraction of the levitation height of the system, and to have a certain specified configuration in the superconductive chamber.

Any of the coils known to those skilled in the art may be used in the invention; and any of the materials conventionally used in such coils also may be utilized. Thus, one may use copper wire, silver wire, or superconducting wire. As is known to those skilled in the art, superconducting wire may be made out of any of the superconducting materials. See, for example, U.S. Pat. No. 4,796,511 of Eyssa, the disclosure of which is hereby incorporated by reference into this specification.

In one preferred embodiment, wherein copper or silver wire is used, it is preferred that the gauge of the wire be from about 10 to about 40. As is known to those skilled in the art, the gauge of a wire conductor is specified as "American Wire Gauge Conductor Series"; and an AWG number of 26, e.g., refers to 26 gauge wire. A table describing the AWG conductor series appears, e.g., on page 766 of Herbert W. Jackson's "Introduction to Electric Circuits," Sixth Edition (Prentice Hall, Englewood Cliffs, N.J., 1986), the disclosure of which is hereby incorporated by reference into this specification.

It is preferred that one use a wire conventionally referred to as "magnet wire" with a gauge of from about 20 to about 30; see, e.g., page 793 of catalog 110 of Newark Electronics, Chicago, Ill.

Figures 4, 5, 5A, 6, 6A:
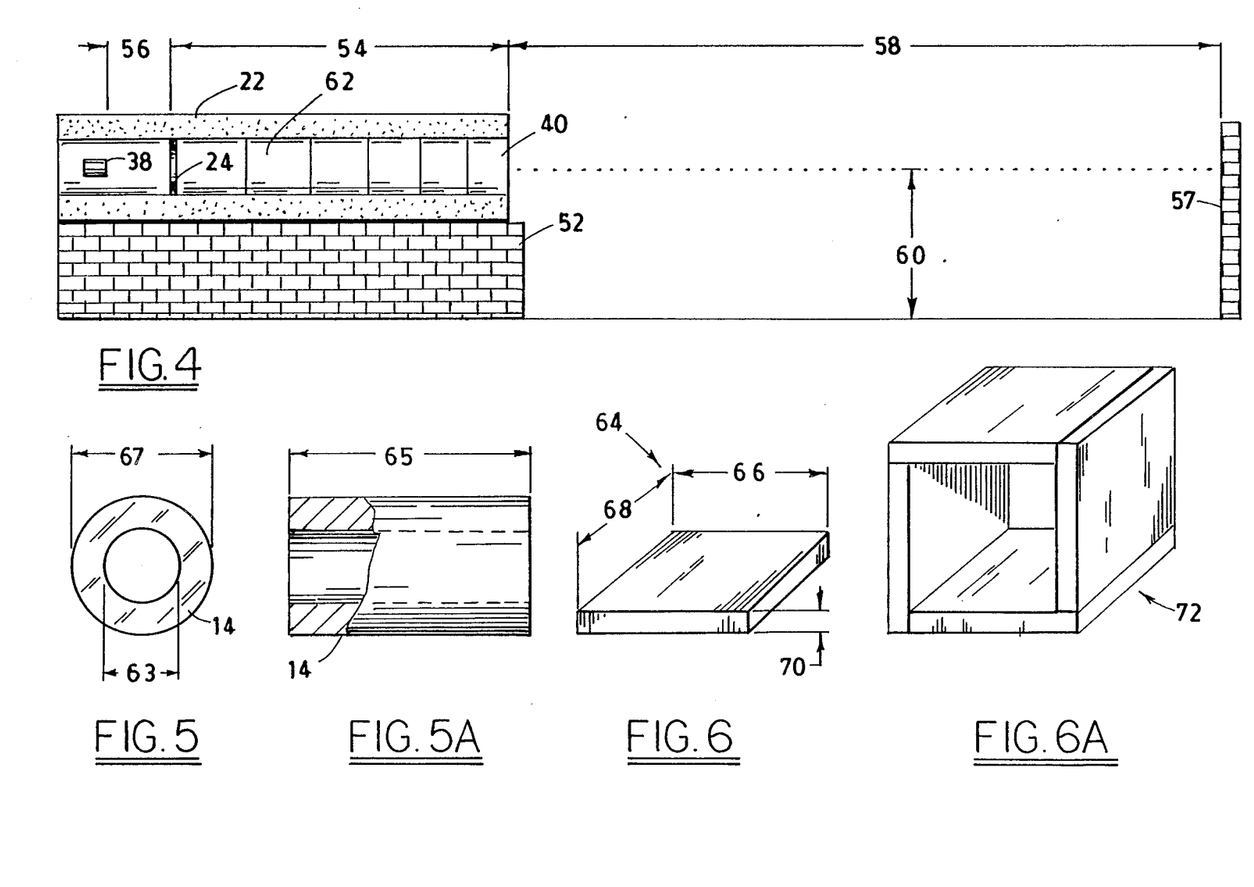
FIG. 4 illustrates a means for evaluating the velocity imparted to a projectile by the system of this invention.
FIGS. 5, 5A, 6, and 6A illustrate certain preferred superconductive chambers which may be used in the apparatus of the invention.

For the embodiment illustrated in FIG. 5, it is preferred that the gauge of the wire in the coils be from about 20 to about 30 and, more preferably, be from about 25 to about 27.

Each electromagnetic coil used in applicants' system preferably has a thickness no greater than the gap which occurs between adjacent superconducting portions of the superconducting chamber. As will be seen by reference to FIG. 1, the superconducting chamber in which the magnetized projectile is levitated is preferably comprised of alternating sections of superconducting material and electromagnetic coils. Thus, the portion of the device shown in FIG. 1 illustrates, from left to right, a superconducting cylindrical portion 14, an electromagnetic coil 24, a second superconducting cylindrical portion, a second electromagnetic coil 26, and a third superconducting cylindrical portion. Each of the superconducting portions 14 are separated by an air gap which is filled by an electromagnetic coil.

The gap between adjacent superconducting cylindrical portions should be no greater in width than about one-half of the levitation height of the system defined above. Thus electromagnetic coils 24 and 26 fit within said gaps and are preferably contiguous with the superconducting cylindrical portions on each side of them; and thus said coils also should be no greater in width than about one-half of the levitation height of the system.

In one preferred embodiment, the internal diameter of the electromagnetic coil is substantially identical to the internal diameters of the superconducting cylindrical portions to which said coils are immediately adjacent and contiguous to; and the external diameters of said electromagnetic coils are substantially identical to the outside diameters of said superconducting cylindrical portions. In one embodiment, each of the superconducting cylindrical portions in the chamber and each of the electromagnetic coils will have the same internal diameter and the same outside diameter.

The length of any one of the cylindrical superconducting elements may be the same as or different than the length of any of the other of the superconducting elements; and the width of any one of the electromagnetic coils may be the same as or different from the width of any of the other of the electromagnetic coils. It is preferred to have at least two of said superconducting cylindrical elements and at least one coil in the device of this invention. In one preferred embodiment, each of the electromagnetic coils will have a different width, a different number of turns, and thus a different magnetic field produced by a specified current from each other.

It is essential that the length of each superconductive cylindrical element be at least about 4 times as great as the width of the electromagnetic coil(s) contiguous with and adjacent to said element.

The means for generating an electromagnetic field, in addition to said electromagnetic coils, also includes connecting leads from a current source. Although FIG. 1 only illustrates leads from pulse delivery means 28 to coil 24, it is to be understood that comparable direct current pulses are also delivered to coil 26 (and to the other coils in the device). However, it should be noted that each of the coils does not receive a direct current pulse at the same time. The direct current pulse delivered to any one coil may be the same, or different, from the direct current pulse delivered to any other coil.

The direct current pulses delivered to the coils are asynchronous. The term asynchronous, as used in this specification, the term asynchronous refers to means for delivering direct current pulses to two or more coils at different periods of time; the asynchrony referred to is one of time. The apparatus of this invention is preferably comprised of means for delivering asynchronous direct current pulses to at least two coils at different periods of time.

The coil(s) used in the apparatus of this invention may be coated by a non-magnetic insulating binder material. Thus, by way of illustration and not limitation, the wire coil may be immersed in a rubber cement, epoxy resin, silicone rubber, and other insulating coatings; see, e.g., Brady and Clauser's "Materials Handbook", Twelfth Edition (McGraw-Hill Inc., New York 1986), the disclosure of which is hereby incorporated by reference into this specification. Thus, referring to page 883 of the Newark Electronics catalog 110, one may use Q-dope, Cornona-Dope, Red-X Corona dope (a thixotropic, polyester-based red enamel), Red-Glypt Insulating Varnish (an alkyd-base compound), and the like.

Direct current is delivered to the coils of the apparatus of this invention. As used in this specification, direct current refers to current which flows in only one direction through a circuit and has a substantially constant amplitude during a given time period. Thus, this term excludes "pulsating direct current."

The electromagnetic force created in any one coil by the direct current pulse may be calculated by means well known to those skilled in the art. Thus, for example, one may use the equation 11.5 described on page 385 of G. P. Harnwell's "Principles of Electricity and Electromagnetism," Second Edition (McGraw-Hill Book Company, New York, 1949), the disclosure of which is hereby incorporated by reference into this specification. This equation 11.5 may be rewritten as:

$$F = M_1 M_2 / (4 P U_o r^2),$$

wherein F is the attractive force between the electromagnetic field and the magnetic object, in newtons; $M_1$ is the pole strength of the electromagnetic coil, in tesla-meters squared; $M_2$ is the pole strength of the magnetic object being levitated, in tesla-meters squared; r is the separation between the surface of the electromagnetic coil and the magnet surface being levitated; and the other terms are defined elsewhere in this specification. $M_1$ is directly proportional to the current (in amperes) delivered to the coil, the number of turns in the coil, and the cross-sectional surface area of the coil; and it is inversely proportional to the radius of the coil. The magnetic induction of the coil (which is equal to $M_1$ divided by the surface area of the coil) may be measured by a Gaussmeter such as the one obtainable from Bell Communications Inc. of Florida). By the same procedure, the $M_2$ of the levitating object also can be determined.

An equation enabling one to estimate the pinning force of the superconductive chamber is presented on pages 8 to 9 of the specification. One must provide a sufficient amount of direct current to the coil(s) so that its magnetic force (as defined by the equation on page 17) is at least about ten times as great as the pinning force of the chamber, as calculated by the pinning force equation. Thus, the apparatus of this invention provides a means of generating an electromagnetic force which is at least ten times as great as the pinning force of the superconductive chamber.

One means of providing a sufficient amount of electromagnetic energy to the system is illustrated in FIG. 1. Referring to FIG. 1, means for delivering direct current pulses 28 is comprised of power supply 30, controller 32, power transistor 34, leads 36, and coils 24 and 26.

Power supply 30 provides a means for supplying a direct current and voltage to the coil(s) in the system. The power supply is adjustable, and one may vary the amount of voltage and/or current delivered. Any suitable power supply 30 may be used. Thus, e.g., one may use any of the d.c. power supplies described on pages 512, 515, and 521 of the catalog 110 of Newark Electronics.

In one preferred embodiment, the power supply used was a 20 volt, 12 ampere 6263ADX power supply obtained from Harrison Laboratories.

The rise time of the power supply should be relatively small. As used in this specification, the term rise time refers to the time, in seconds, it takes the power supply to rise to the specified current or voltage desired from the system. In general, the power supply 30 must have a rise time of less than 1 millisecond.

Another important parameter is the decay time. As used in this specification, the decay time is the amount of time, after the power supply is turned off by a control signal, it takes the current or voltage applied to the coil to return to zero. The decay time should be less than about 1 millisecond. The rise time and the decay time will vary with the inductance associated with the system, which is mainly due to the coil.

Controller 32 sends out a controlled signal to the base of the power transistor 34 and thus, by changing the bias voltage of the PNP transistor, changes the output signal from the emitter of the transistor, which is delivering current to the coil. In the configuration shown in FIG. 1, when the output from controller 32 is most positive, no current flows from the emitter to the coil. The maximum amount of current flows to the coil when the output from the controller is most negative. As is apparent to those in the art, if an NPN transistor is used, the opposite situation will occur; the maximum amount of current will flow when the controller output is most positive.

The controller illustrated in FIG. 1 is an an Intel 8085 Microprocessor (made by Intel Corporation, Santa Clara, Calif.). This controller is capable of delivering a control signal to a switch (the transistor) which delivers pulses to the switch at different points of time. In the embodiment shown in FIG. 1, the controller delivers on-state pulses ($-5$ volts) and off-state pulses (0 volt).

Any means for delivering pulses to the switch at different points in time may be used as controller 32. Thus, by means of illustration, and not limitation, one may use a computer, a mechanical switch, and the like.

The pulses delivered by controller 32 are supplied to switch 34 which, in the embodiment illustrated in FIG. 1, is an PNP type power transistor. This power transistor is capable, in response to receiving negative bias signals from controller 32, of switching current from power supply 30 on and off.

It will be apparent to those skilled in the art that other switches 34 may be used. Thus, e.g., one may use an NPN transistor with the opposite polarity. Thus, e.g., one may use other semiconductor switches such as TRIACs, thyristors, mechanical relays, and the like. These and other suitable switching devices are described in the "McGraw-Hill Encyclopedia of Electronics and Computers," (McGraw-Hill Inc., New York, 1984), the disclosure of which is hereby incorporated by reference into this specification.

The power supply 30, the controller 32, and the power transistor 34 provide only one means of delivering intermittent direct current pulses to coil 24. As will be apparent to those skilled in the art, other such means can be used. Thus, for example, one may use high-current pulse generators obtainable from, e.g., Hewlett Packard Company of New Jersey. Thus, e.g., one may use the power supply circuits described in R. F. Graf's "The Encyclopedia of Electronic Circuits" (Tab Books, Inc., Blue Ridge Summit, Pa., 1985), the disclosure of which is hereby incorporated by reference into this specification.

For the sake of simplicity, controller 32 is shown controlling the provision of direct current pulses to only coil 24 in FIG. 1. However, controller 32 may be used to control up to eight different circuits and, via these circuits, may deliver asynchronous direct current pulses to up to 8 different coils in an apparatus similar to that illustrated in FIG. 1. When more than one coil is present in such apparatus, controller 32, and/or some similar device, must deliver asynchronous direct current pulses to the coils in such apparatus. Such coils must receive their direct current pulses at different times from the other.

In one embodiment, not shown, the Intel 8085 microprocessor is combined with additional circuitry (a multiplexer) and thus enabled to control the output to more than eight coils. In another embodiment, not shown, the controller 32 used is a Motorola 68000 microprocessor capable of controlling 16 individual coils (obtainable from Motorolla Semiconductor Products, Inc. of Phoenix, Ariz.). In yet another embodiment, a separate circuit is used to provide the asynchronous d.c. pulse to coil 26. In yet another embodiment, a personal computer is used as controller 32.

Figures 2, 3:
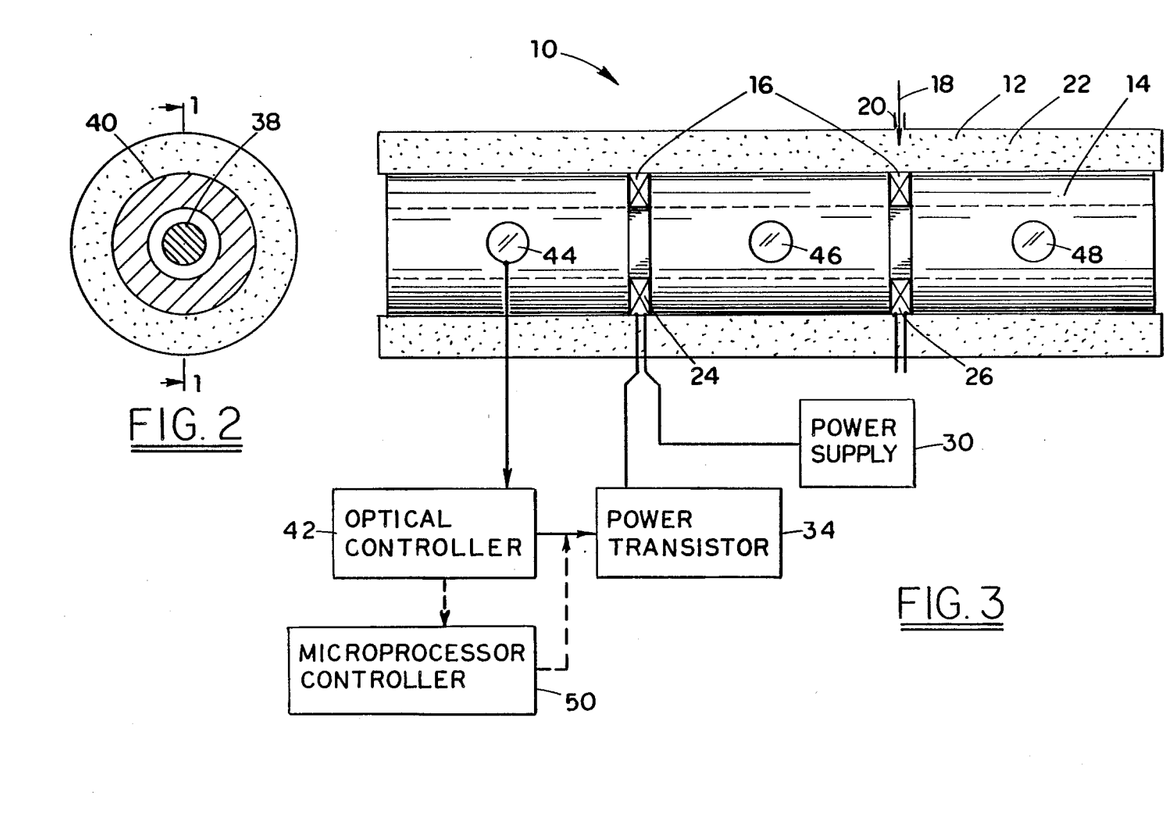
FIG. 2 is an end view of the superconducting chamber of the embodiment of FIG. 1.
FIG. 3 is a schematic illustrating another preferred embodiment of the invention.

FIG. 2 is a cross-section of the superconducting chamber of FIG. 1. Magnetic object 38 levitates within symmetrical superconductive cylinder 40 which is cooled by the liquid nitrogen in the cooling chamber.

An alternative means of providing asynchrounous direct current pulses to coils 24 and 26 is illustrated in FIG. 3. This embodiment is comprised of a multiplicity of optical sensors 44, 46, and 48 which, in response to the movement of a projectile within the cylindrical superconductor chamber 40, activates the delivery of a direct current pulse to a coil.

Any of the optoelectronic sensing devices known to those skilled in the art may be used. Thus, for example, one may use the optoelectronic devices described on pages 13 to 25 of Archer's 1986 Semiconductor Reference Guide catalog (catalog number 276-4009, Radio Shack Corporation, Fort Worth Tex.). Thus, one may use the optical sensors described on pages 68, 69, 83, 94, 95, 126, and 127 of catalog 110 of Newark Electronics.

The prior art optical sensors may be used in different configurations. In one circuit, the direct current to each of coils in the apparatus is on, and the optoelectronic device sends out a signal in response to the projectile's motion, turning off the coil which the projectile is approaching. In this embodiment, the coils are so wound that, in their on position, they attract the projectile.

In another embodiment, the coils in the system are off prior to the movement of the projectile. The coil closest to the projectile is first turned on (to attract it) and then off (to allow it to pass through the coil substantially unimpeded). Thereafter the next coil is turned on before the projectile reaches it, and then turned off, etc. The projectile thus may be accelerated down the chamber at a controlled rate by the application of asynchronous direct currents to the coils.

The movement of the projectile past or near an optical sensor activates that sensor. Thereafter, as is shown in FIG. 3, a signal may be sent from sensor 44 to optical controller 42.

Optical controller 42 may be any means for supplying a control signal to switch 34 in response to a signal from the optical sensor. Thus, e.g., controller 42 may be a transistor circuit, a mechanical relay, and the like.

In the embodiment shown in FIG. 3, a signal is sent from optical controller 42 to switch 34. Switch 34 controls the power supplied to the coil by power supply 30. Thus, this circuit works in substantially the same manner as the circuit of FIG. 1, with the exception that controller 32 of FIG. 1 is replaced by the combination of optical sensors 44, 46, and 48 and the corresponding optical controllers 42 associated therewith. It will be appreciated by those in the art that separate optical control circuits may be associated with each of optical sensors 46 and 48; they are not shown in FIG. 3 for the sake of simplicity.

In another embodiment illustrated in FIG. 3 by dashed lines, a signal is sent from optical controller 42 to microprocessor controller 50 which, in turn, provides on/off control commands to switch 34. This microprocessor 50 can be used with suitable software to vary the type and duration of the pulses supplied to the coils, and more than one circuit may be connected to it.

FIG. 4 illustrates a method for measuring the velocity which can be imparted to a magnetic body by applicants' apparatus. The structure illustrated in FIG. 4 is comprised of a brick support surface 52, a target 57, and means for measuring how far the magnetic body travels and how far it drops in its trajectory under the influence of gravity.

Referring to FIG. 4, a magnetic body 38 is acclerated by coil 24 in accordance with the procedure described in connection with FIGS. 1 and 3. One may use a chamber with more than one coil 24.

The accelerated projectile 38 travels through the interior of cylinder 62 and towards target 57. The length ("x"), 58, of travel once it exits the superconductive chamber 62 is measured. The distance from the center line of its trajectory (see dotted line) to the bottom of the test device, 60, also is measured. Thereafter, the difference between the distance 60 and the height of that portion of target 57 where the projectile hits (measured from the bottom of the device to the point of impact) is calculated; this difference is "y".

The velocity of the projectile 38, as it leaves the cylinder 40, is epxressed by the following equation:

$$V = (gx^2/2y)^{\frac{1}{2}},$$

wherein V is the velocity (in meters per second), g is the gravitational constant, and x and y are as defined above. See, for example, the discussion of this equation in Sears et al.'s "University Physics," Sixth Edition (Addison-Wesley Publishing Company, Reading, Mass., 1983), the disclosure of which is hereby incorporated by reference into this specification.

The test procedure shown in this FIG. 4 was used in the experiment described in the examples.

FIG. 5 illustrates one preferred embodiment of a cylindrical superconductive chamber of this invention. In this embodiment, the internal diameter 63 of the chamber is 1.20 centimeters, and the external diameter 67 is 2.54 centimeters. It will be appreciated that other chambers whose internal and external diameters are in the same ratio also may be used. Thus, e.g., if the internal and external diameters are 1.20 and 2.54 feet, respectively, the device may still be used.

FIG. 5A is a front view of the apparatus of FIG. 5, partially broken away to show the interior of the device. The length 65 of cylinder 40 may be from about 1 to about 10 centimeters and, in one embodiment, is 3.5 centimeters.

FIG. 6 illustrates one square, superconductive plate 64 which may be used to prepare a square chamber 72 shown in FIG. 6A. Additionally, or alternatively, the plate 64 may be used to construct the apparatus of FIGS. 8 and 8A.

Referring to FIG. 6, one preferred embodiment of plate 64 is shown. This preferred embodiment has a length 66 of 2.54 centimeters, a length 68 of 2.54 centimeters, and a width 70 of 1.34 centimeters. It may be connected with three other plates 64 to prepare square chamber 72. See FIG. 6A.

Conventional means may be used to connect plates 64 to each other. Thus, by way of illustration, one may use an epoxy resin adhesive. As is known to those skilled in the art, epoxy resins have in their molecules a highly reactive oxirane ring. See, e.g., pages 287-289 of said "Materials Handbook," Twelfth Edition, supra. One preferred epoxy resin adhesive useful for joining plates 64 together is "1266 Epoxy A and B" which is manufactured by the Emerson and Cuming Company of Massachusetts and is sold by Dean Co. of Ithaca, N.Y.

Figure 7:
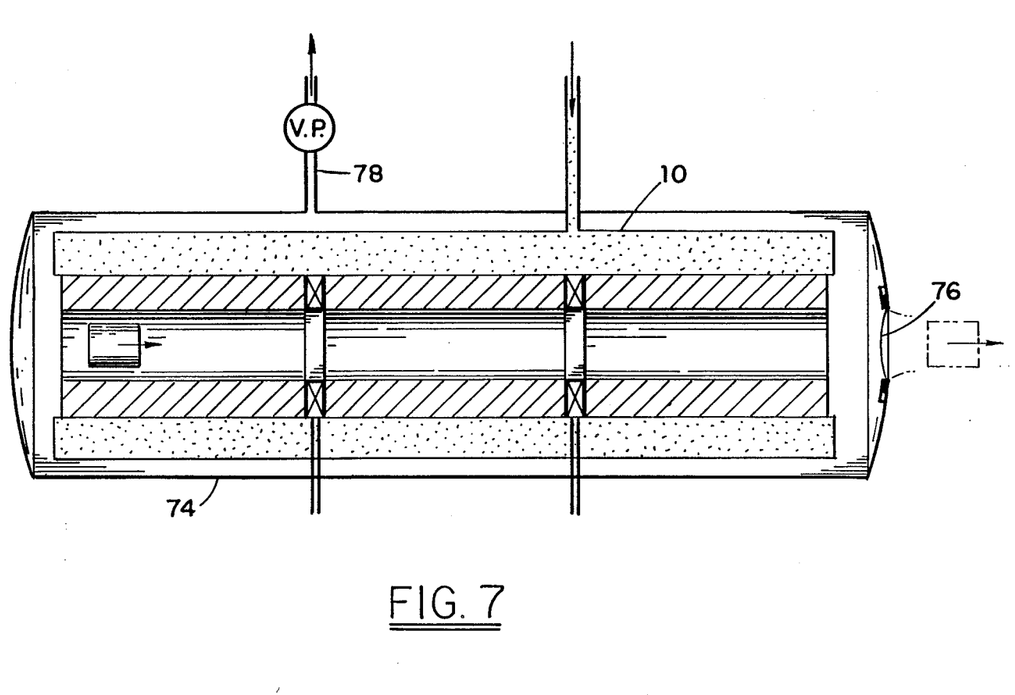
FIG. 7 illustrates an embodiment of the invention in which the apparatus of FIG. 1 is maintained under vacuum.

FIG. 7 illustrates a preferred embodiment of the invention in which moisturized air resistance to the magnetized object's movement is minimized by means of a vacuum system. The apparatus is especially useful for imparting high velocity to magnetized projectiles.

As is known to those in the art, the drag upon an object may be estimated by the following equation:

$$\text{air drag} = 0.5 \, s \, V^2 \, AC_D,$$

wherein s is the density of air (in grams/cubic meter), V is the relative velocity between the magnetized object and air (in meters/second), A is the frontal area of the projectile (in square meters), and $C_D$ is the dimensionless factor calculated from the ratio of the width and the height of the front of the projectile. This equation is discussed in F. M. White's "Fluid Mechanics".

The apparatus of FIG. 7 is designed to minimize the drag upon the projectile accelerated in the apparatus. It is comprised of an inlet line for liquid nitrogen (as is illustrated by the inlet arrow), means for imposing a vacuum (see the vacuum pump), by vacuum outlet pump line 78, and by vacuum enclosure 74. Once a vacuum is imposed upon the system via line 78, the system is substantially air tight; and a projectile travelling down the superconductive chamber of the device encounters virtually no resistance due to air.

In the embodiment illustrated in FIG. 7, the apparatus contains a diaphragm 76 which, as the projectile approaches it, opens up to allow its passage. Means (not shown) are provided to automatically open said diaphragm when the projectile approaches and/or close it after it departs. These means may comprise a magnetic and/or optical sensor system such as, e.g., the one described in connection with FIG. 3.

In another embodiment, not shown, the diaphragm does not open as the projectile approaches but is pierced by the projectile.

In yet another embodiment, the apparatus does not contain a diaphragm. In this embodiment, the magnetized object is moved within the vacuum chamber and never leaves it.

It is to be appreciated that, although most of the discussion herein has related to linear motion of magnetized bodies, applicants' apparatus is equally applicable to moving magnetized objects in a two-dimensional trajectory. Thus, by way of illustration, the principles of the invention may be used for a circular trajectory, a elliptical trajectory, a linear trajectory in which an object is moved along a straight line. Furthermore, systems can be constructed in which three-dimensional trajectories are provided; thus, for example, the magnetized object may be moved up and down a ladder trajectory. In each of these embodiments, a combination of superconductive tracks, coils, and means for providing asynchronous direct current to said coils is involved.

The velocity imparted to the magnetized object by the apparatus of FIG. 7 or FIGS. 1 and 3 is expressed by the equation:

$$V_f = V_i + at, \text{ wherein}$$

$V_f$ is the final velocity of the magnetized object for each stage of an acceleration coil (in meters per second), $V_i$ is the initial velocity of the object, a is the acceleration imparted by electromagnetic force (in meters/second squared), and t is the time (in seconds). Thus, as can be determined from this equation, linear motion occurs between two coils in the apparatus of the invention.

The preferred apparatus of the invention is comprised of at least two separate sections, each of which contains a portion comprised of superconductive material and a coil. It will be apparent that, depending upon the intensity and the direction of the electromagnetic fields imparted to the two adjacent sections, the magnetized object will either increase or decrease its velocity between the sections. Thus, in one embodiment, the electromagnetic fields imparted to the coils both tend to increase the velocity of the projectile, thus accelerating it down the chamber. Alternatively, one may have one of the electromagnetic fields around one of the coils opposing the motion of the magnetized object, thereby tending to slow it down or stop it as it approaches such coil; in such an embodiment, an object can be moved to one station, stopped by the field of the coil at or near this station, reaccerlated when the polarity of the field at or near such station is changed (by changing the polarity of the current to the coil), and the like. It is apparent that this process may be adapted to many industrial material handling processes in which an object may be moved to a station, worked upon, moved to another station, etc.

In one embodiment, not shown, the object moved by the apparatus of this invention need not be magnetized. In this embodiment, the object is contained in magnetized tote box, and the magnetized tote box with the object in it is moved by the system. The tote box may be accelerated, moved back and forth, or stopped by the system. This embodiment will become more evident upon an examination of FIG. 8.

Figure 8:
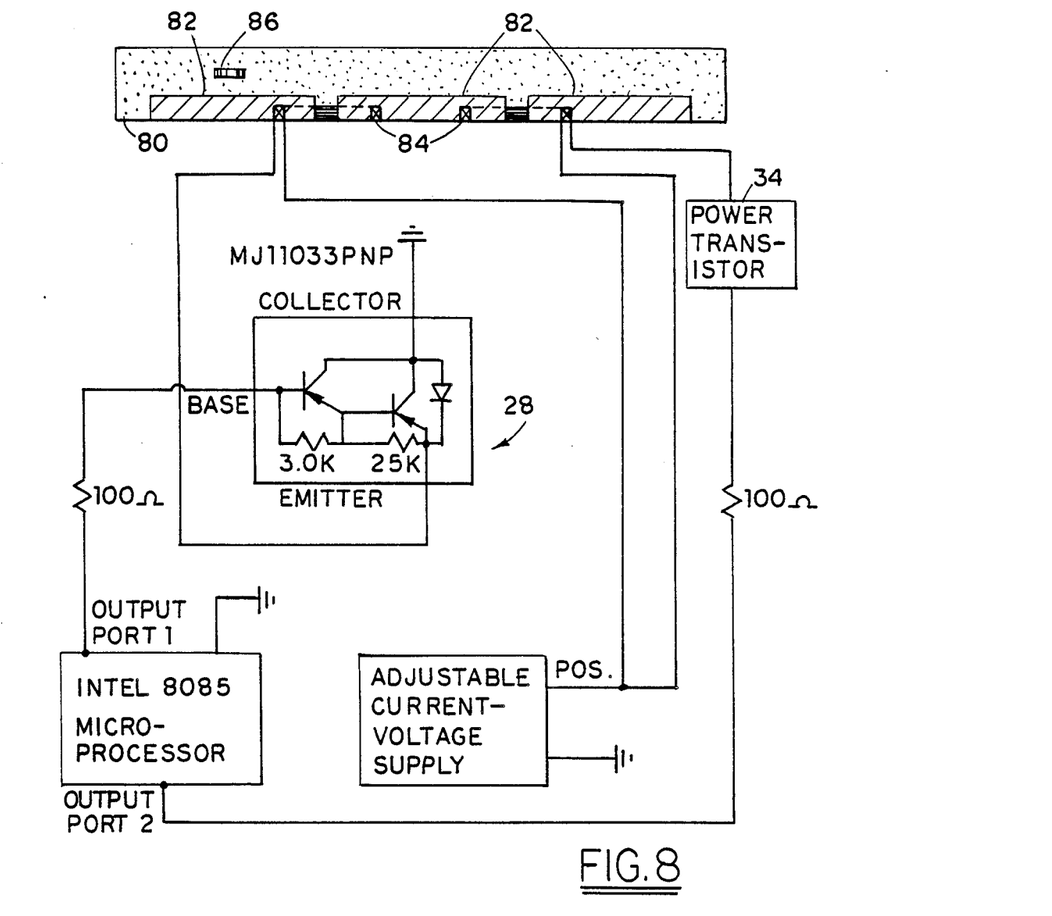
FIGS. 8 and 8A illustrate a kit which may be used to demonstrate the scientific principles of the invention.

FIG. 8 is a front view of a demonstration kit which illustrates some of the scientific principles discussed above. The demonstration kit is comprised of cooling tray 80, superconducting plates 82, coils 84, and magnetized object 86. The kit also is comprised of means for supplying asynchronous direct current pulses to each of coils 84.

The cooling tray 80 of the kit is comprised of liquid nitrogen. Superconductive plates 82 are immersed in this liquid nitrogen and cooled by it. Coils 84 are between and beneath adjacent plates 82.

Figure 8A:
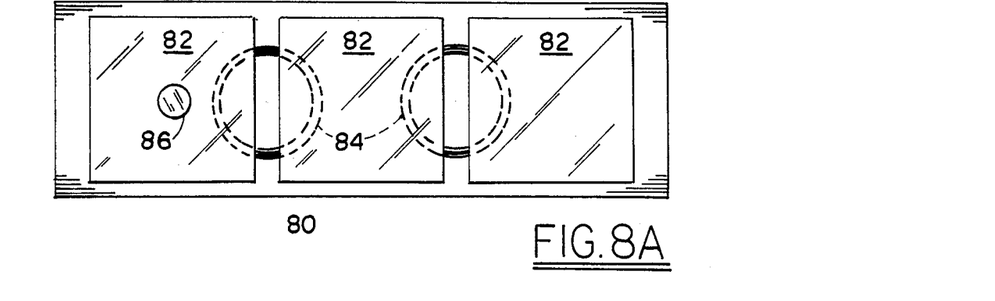

FIG. 8A is a top view of the kit of FIG. 8. As may be seen from FIG. 8A, each of circular coils 84 is beneath and partially between the plates 82. The electromagnetic fields emanating from coils 84 flow up through the air gaps between plates 82 and interact with magnetized object 86.

FIG. 8A shows magnetized object 86 travelling from left to right. As object 86 approaches the left coil 84, it interacts with electromagnetic flux from this coil which tends to pull it towards the right. As the object travels near the center of the left coil, one may turn the coil off and collapse the magnetic field around it, thus allowing the object 86 to continue its movement towards the right coil. Alternatively, if one does not turn the left coil off, the magnetized object 86 will tend to be trapped by the flux emanating from the left coil. Thus, it is essential if one desires the object to readily pass by a coil to remove the electromagnetic field from it prior to the time the magnetized object reaches the center of the coil.

Once the magnetized object 86 has passed the left coil in the device, it approaches the right coil. One may either accelerate or deaccelerate its motion, depending upon the polarity of the direct current fed to the right coil. If the current polarity is such that the electromagnetic field opposes the motion of the object, the object's motion will be slowed and/or stopped, depending upon intensity of the magnetic field created. Conversely, if the electromagnetic field aids the motion of the object, its velocity will be increased; however, in order to continue or maintain such velocity, the coil should be turned off before the object reaches its center.

In the preferred embodiment illustrated in FIGS. 8 and 8A, the coil is inserted in notches cut into plates 82. This embodiment may be used for a system in which a magnetized article (or a magnetized tote containing an article) is moved back and forth over a substantially flat plane surface comprised of plates 82, air gaps, and coils beneath the plates.

In another embodiment, not shown, walls may be extended upwards from each of the sides and/or ends of the flat plane surface. Thus, in this embodiment, a substantially U-shaped structure may be defined which is comprised of U-shaped sections of superconductive material, and air gaps therebetween under which sit electromagnetic coils. Alternatively, instead of U-shaped sections, one may use curved sections, straight walls extending from the bases of plates 82 at acute or obtuse angles, and the like. Furthermore, a cover comprising superconductive material may cover part or all of the top of the structure; see, for example, FIG. 6A. Although it is preferred that each part of the structure contain the same superconducting materials, different superconducting materials may be used in different parts of the structure.

Referring again to FIG. 8, a circuit is shown for providing asynchronous pulses to each of coils 84. The microprocessor is provided with a program to turn the left coil on for a specific duration and then off for another specific duration. The microprocessor also controls the right coil, which, in the embodiment shown, is pulsed in the opposite way of the left coil, thus causing a back and forth motion of the object. An example of a program which may be used for this purpose is described in the Examples.

Figure 9:
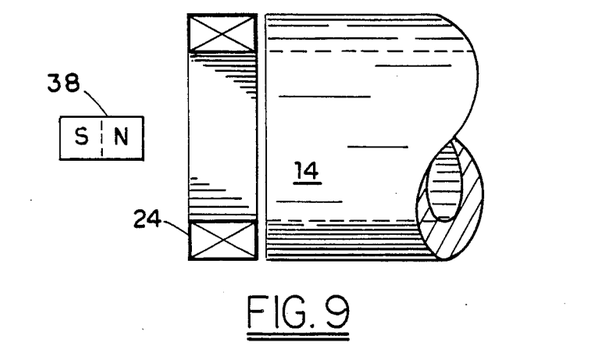
FIG. 9 illustrates a preferred arrangement of a magnetic projectile, a coil, and a superconductive chamber.

FIG. 9 illustrates the forces between a magnetized object and the coil. If the field of the coil closest to the north pole of the magnetized object is a south pole, it will attract object 38; and it will repel it if it is a south pole. As is known to those in the art, the field of the coil will vary with the direction of the current flow in accordance with the right hand rule.

The coil in FIG. 9 is in the shape of a cylinder and has substantially the same shape as that of the superconducting chamber material 14. If, however, the shape of chamber material 14 is of another shape, like a square shape (see FIG. 6A), e.g., a coil which has a substantially square shape should be used. It is preferred that the interior shape of the coil substantially match the interior shape of the chamber.

It should be noted that the magnetized object should be disposed within the chamber so that either its north or south pole approaches the center of the coil. If, for example, the magnetized object were rotated 90 degrees, the field from the coil will tend to twist it. Thus, the magnet 86 of FIG. 10, if it were disposed in the same direction, would not work in the embodiment of FIG. 9.

Figure 10:
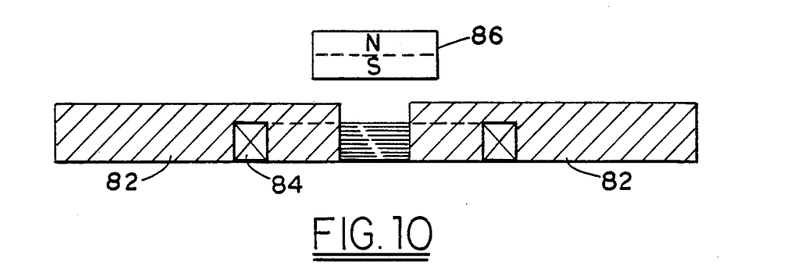
FIG. 10 illustrates another preferred arrangement of a magnetic object, superconductive plates, and a coil.

FIG. 10 is a front view of the embodiment of FIG. 8. The polarity of the magnetized object shown is proper for this configuration. If one were to substitute the magnet 38 of FIG. 9 in the embodiment of FIG. 10, linear motion of the object cannot be achieved in such configuration. It should also be noted that the configuration of FIG. 10 may be used with the chamber of FIG. 6A. Furthermore, such configuration also might be used with the chamber of FIG. 5A.

Figures 11, 11A:
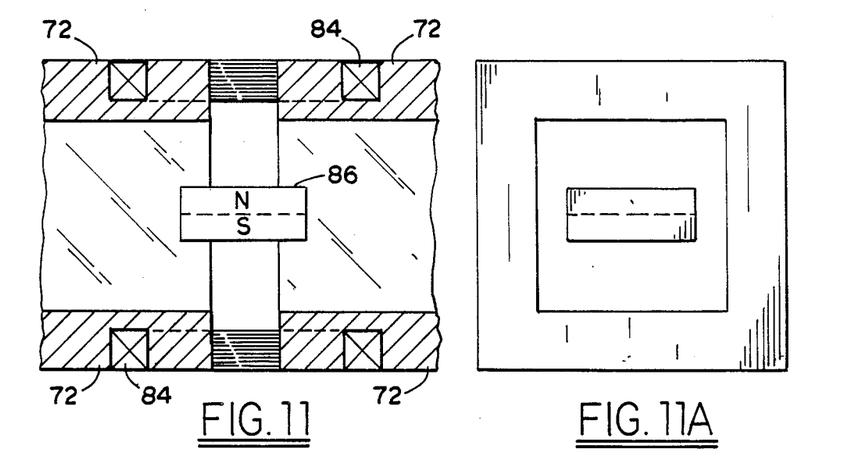
FIGS. 11 and 11A illustrate yet another preferred arrangment of a magnetic object, two coils, and a square superconductive chamber.

FIG. 11 illustrates an embodiment utilizing the square chamber of FIG. 6A. Two sections of such square chamber are shown separated by an air gap, and two electromagnetic coils 84 are inserted into notches cut into the tops and bottoms of these two square chambers. The magnetized object 86 is moved between the two chambers by the application of direct current applied to the coils; in this embodiment, synchronous direct currents both provide fields which are in phase and which affect the motion of the magnetized object in substantially the same manner. Although synchronous currents are applied to such top/bottom paired coils in the chamber, asynchronous direct currents may be applied to other paired sets of coils in the system.

FIG. 11A is a side view of the embodiment of FIG. 11.

The following Examples are presented to illustrate the claimed invention but are not to be deemed limitative thereof. Unless otherwise stated, all parts are by weight and all temperatures are in degrees centigrade.

EXAMPLE 1

40.07 grams of ytttrium oxide (obtained from Aldrich Chemical Corporation, Milwaukee, Wisc., catalog number 20,492-7, 1988-89 catalog), 139.84 grams of barium carbonate (catalog number 20,271-1, 1988-89 Aldrich catalog) and 85.34 grams of copper oxide (catalog number 32,545-7, 1988-89 Aldrich catalog) were mixed by hand with a mortar and pestle for about 5 minutes.

The ground powder mixture was then calcined in a Lindberg box (muffle) furnace (model number 10,549-110C, available from the Fisher Scientific Company, Springfield, N.J., see page 539 of 1988 Fisher catalog). The temperature of the mixture was raised from ambient temperature to a temperature of 920 degres centigrade at a rate of 300 degrees centigrade per hour. Thereafter, the material was maintained at said temperature of 920 degrees centigrade for 12 hours. Thereafter, it was cooled from this temperature to ambient temperature at a rate of 300 degrees per hour.

The entire calcination cycle described above was repeated twice. Thereafter, the calcined material was ground in a mortar and pestle for about five mintues until substantially all of its particles were smaller than 53 microns.

The ground and calcined material was then pressed in special die made from medium carbon rolled steel. This die was comprised of three parts. The first part is an internal, solid pin with a diameter of 1.195 centimeters and a length of 10 centimeters; this part is used to define the internal diameter of the superconducting chamber. The second part is a two-part middle cylinder with the same cross-sectional dimensions as the superconducting cylinder specified in FIGS. 5 and 5A; one of such parts, the upper cylinder, has a length of 4 centimeters, and the other of such parts, the lower cylinder, has a length of 10.5 centimeters. The third part is a cylindrical outer housing with a length of 10 centimeters, and inside diameter of 2.545 centimeters, and an outside diameter diameter of 5 centimeters.

The solid pin was inserted into the lower middle cylinder. These two pieces were then inserted into the outer housing cylinder. The empty space between the solid pin and the outer housing was filled with the calcined material described above. Then the upper middle cylinder was applied to the top of the loose powder, and the powder was pressed under a pressure of 16,000 pounds and at ambient temperature for about 6 minutes. A stable cylindrical shape was produced with the dimensions and shape shown in FIGS. 5 and 5A.

The cylinder so produced was sintered using the aforementioned Lindberg furnace under flowing oxygen for twenty-four hours. The oxygen flow rate used was 1 cubic centimeter per minute. The material was first raised from ambient to 920 degrees centigrade at a rate of 300 degrees per hour. Thereafter, it was maintained at 920 degrees centigrade for 24 hours, cooled to 650 degrees centigrade at a rate of 100 degrees per hour, maintained at 650 degrees centigrade for 6 hours, and cooled to ambient at a rate of 300 degrees centigrade per hour. The entire sintering cycle occurred under flowing oxygen.

The properties of the sintered cylinder were evaluated. The temperature of the superconducting transiton, Tc, was evaluated in accordance with the procedure described in a paper by M. Pistakis and X. Wang, "Automated Superconductor Measurements System," The Review of Scientific Instrum., 60(1), pages 135-136, January 1989, the disclosure of which is hereby incorporated by reference into this specification; a Keithly current source providing about 1 milliampere to the sample (model number 228A, Keithly Instrument Inc., Cleveland, Ohio) was used. A Keithly multimeter (model 195) was used as a voltmeter to measure the voltage drop across the superconducting sample due to the current. The resistance of the sample at a given temperature is equal to the voltage divided by the current. Another Keithly multimeter (model 196) was used as a voltmeter for the thermocouple. The Tc of the material was 90 degrees Kelvin.

A portion (less than 1 gram) of the sintered cylinder was ground by mortar and pestle to produce powder whose particles were smaller than 53 microns; this powder was then subjected to Powder X-ray diffraction analysis on a Siemens D-500 Diffractometer (model number C72298-A223-B-9-POZ-288, manufactured by Siemens Company of West Germany) using copper K-alpha radiation and a diffracted beam graphite monochrometer. Analysis revealed a pure yttrium—barium—copper 1-2-3 phase.

EXAMPLE 2

The procedure of Example 1 was repeated with the exception that X-ray diffraction analysis was not conducted on a portion of the sintered cylinder.

A cylindrical cooling chamber was constructed from copper; this chamber had an internal diameter of 2.54 centimeters, an external diameter of 4.8 centimeters, and a length of 16.0 centimeters. The sintered cylinder was inserted into the cooling chamber. Thereafter, liquid nitrogen was poured into the chamber to cool the cylinder to a temperature of about 77 degrees Kelvin.

A cobalt magnet, purchased form the Edmund Scientific Company of Barrington, N.J. (model number D30,962) was then modified to the shape 38 shown in FIG. 9 and placed inside the cooled cylinder. The magnet levitated near the center of the cylinder, and maintained a stable position in the center of the cylinder indefinitely.

EXAMPLE 3

The procedure of Example 2 was repeated to produce ten sintered cylinders.

"AWG 26 gauge magnet wire" (obtained from the Newark Electronics Company of Chicago, Ill., as catalog number 36F1317, the Newark catalog #110) with a length of 1020 feet was wound into a series of 12 coils with inner diameters of 1.20 centimeters, outer diameters of 2.54 centimeters, and widths of 3.3 millimeters; these coils were wound upon a Sears and Roebuck lathe (model number TLI-1622) equipped with a counter. After each coil was wound, it was submerged in a Q-dope coating (Newark Electronics, catalog number 00Z001, catalog number 110) for one minute at ambient temperature so that the adhesive had an opportunity to completely coat the coil. The coated coils were then dried under ambient conditions for 24 hours.

The dried coils were then tested for resistance with a Fluke Digital multimeter (model 44FX619, Newark Electronics Company, catalog 110); each of the coated coils had a resistance of about 24.5 ohms.

An INTEL 8085 microprocessor (INTEL Corporation, Santa Clara, Calif.), a PNP type power transistor MJ11033, Newark Electronics, catalog 110), a 100 ohm resistor (catalog number 10F300, Newark Electronics, catalog 110), and a 20 volt, 12 ampere adjustable power supply (Harrison Laboratories, model number 62632AXDC) were connected to each coil using connecting wire (part number 36F182, Newark Electronics catalog 110) to form the circuit shown in FIG. 1.

The following software program was written to provide positive direct current voltage control signals from the output ports of the microprocessor the each of the coils.

| PROGRAM #1 | | |
|---|---|---|
| MEMORY ADDRESS (HEX) | INSTRUCTION (MNEMONIC) | MEMORY CONTE. (HEX) |
| 2000 | MVI A,OFFH | 3E |
| 2001 | | FF |
| 2002 | OUT 3 | D3 |
| 2003 | | 03 |
| 2004 | CYCLE: MVI A,7F | 3E |
| 2005 | | 7F |
| 2006 | OUT 1 | D3 |
| 2007 | | 01 |
| 2008 | MVI B,CT1 | 06 |
| 2009 | | CT1 |
| 200A | DLY1: MVI C,CT2 | 0E |
| 200B | | CT2 |
| 200C | DLY2: DCR C | 0D |
| 200D | JNZ DLY2 | C2 |
| 200E | | 0C |
| 200F | | 20 |
| 2010 | DCR B | 05 |
| 2011 | JNZ DLY1 | C2 |
| 2012 | | 0A |
| 2013 | | 20 |
| 2014 | MVI A, 11111111B | 3E |
| 2015 | | FF |
| 2016 | OUT 1 | D3 |
| 2017 | | 01 |
| 2018 | MVI B,CT3 | 06 |
| 2022 | | 1A |
| 2023 | | 20 |
| 2024 | JMP CYCLE | C3 |
| 2025 | | 04 |
| 2026 | | 20 |

CONTROL DEFINITIONS:
2005 - OUTPUT PORT LOCATION
CT1 & CT2 - COUNTER FOR SIGNAL OUTPUT "ON"
CT3 & CT4 - COUNTER FOR SIGNAL OUTPUT "OFF"
2025 & 2026 - LOCATION OF NEXT INSTRUCTION (JUMP TO BEGINNING TO CYCLE OR JUMP TO NEXT PROGRAM)

The cylinders were then placed in the cooling chamber in alternating order with the coils and contiguous therewith (see FIG. 1). The cooling chamber was then filled with liquid nitrogen, and the system was allowed to cool down for 5 minutes until the superconducting cylinders were cooled below their critical temperature. The power supply was set to 3.2 amperes, and a pulse duration of 0.25 seconds was set with the microprocessor. This system, which was used to measure the velocity of the projectile, is illustrated in FIG. 4. Referring to FIG. 4, length 56 is 2.8 centimeters, length 54 is 13.5 centimeters, and height 60 is 14.1 centimeters.

The cobalt magnet of Example 2 was then disposed within the superconductive chamber and acclerated down the chamber by the application of direct current pulses to the coil. This procedure was repeated 9 times.

Referring to FIG. 4, the length 58 travelled by the magnet, "x," was 63.2 centimeters. The height "y," defined on page 24 of this case, was 8.8, 7.9, 9.3, 9.0, 7.8, 9.1, 8.5, 8.0, and 9.6 centimeters, respectively, for the nine runs. The velocity of the projectile, as calculated by the equation on page 24 of this case, was 4.72, 4.98, 4.59, 4.66, 5.0, 4.64, 4.8, 4.95, and 4.52 meters per second, respectively, for the nine runs. The average velocity for the nine runs was 4.72 meters per second.

EXAMPLE 4

In substantial accordance with the procedure of Example 1, superconducting powder material was prepared.

A die was constructed to prepare the superconducting plate shown in FIG. 6. The die, which was made of medium carbon rolled steel, was 10 centimeters tall, with a 5 centimeter by 5 centimeter cross section; the die had a hollow center that was 2.54 centimeters by 2.54 centimeters. A solid insert was used that was 2.53 centimeters × 2.53 centimeters, with a thickness of 0.5 centimeter. The powder material was inserted into the die and pressed at pressure of 16,000 pounds and at ambient temperature.

The pressed shapes were then sintered in accordance with the procedure described in Example 1. The sintered plates were then tested with the cobalt magnet of Example 2, which was disposed within the square chamber. The levitation height of the magnet was measured and found to be 0.7 centimeters.

The circuit of Example 3 was used in this experiment. The software program described in Example 3 was changed by changing CT1, CT2, CT3, and CT4 to 0.7 seconds and changing 2025 and 2026 to jump to the top of the program.

The system of this experiment was configured in accordance with FIGS. 8 and 8A. A plastic cooling tray (80) was filled with liquid nitrogen, and the superconducting plates (82) were allowed to cool for five minutes. The cobalt magnet (86) was placed above the top of plate 82. The program on the INTEL microprocessor was executed, and the magnet (86) was moved back and forth from the left coil to the right coil and back until the program was manually terminated about 25 minutes later.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

We claim:

1. A contactless mass transfer system, comprised of a chamber formed by alternating sections of superconductive material and electromagnetic coils, means for cooling said chamber, and means for delivering asynchronous direct current pulses to said chamber, wherein:
   (a) the interior surfaces of said chamber define a symmetrical shape;
   (b) said chamber is comprised of at least two sections, each of which consists essentially of superconductive material which has a first critical field value greater than about 10 Gauss and a second critical field value of greater than about 30 Tesla, wherein:
      1. said sections consisting essentially of superconductive material are separated from each othger by an air gap, wherein:
         (a) each of the air gaps between two adjacent sections of superconductive material are less than 50 percent of the levitation height of the system, and
         (b) said levitation height is the average distance between the top surface of said chamber and the center of said chamber;
   (c) and electromagnetic coil is disposed within each said air gaps, wherein:
      1. the length of the each of said sections of superconductive material is at least four times as great as the width of each of said coils,
      2. said chamber is comprised of at least two of said electromagnetic coils disposed within said air gaps,
      3. said means for delivering asynchronous direct current pulses provides direct current pulses to at least two of said coils in said chamber at different points in time.

2. The mass transfer system as recited in claim 1, wherein said superconductive material has a critical temperature greater than about 85 degrees Kelvin.

3. The mass transfer system as recited in claim 1, wherein said superconductive material is a Type II superconductor.

4. The mass transfer system as recited in claim 3, wherein the first critical field of said superconductive material is from about 10 to about 100 Gauss.

5. The mass transfer system as recited in claim 4, wherein the second critical field of said superconductive material is from about 30 to about 100 Tesla.

6. The mass transfer system as recited in claim 5, wherein said superconductive material is comprised of from about 0.1 to about 10 weight percent of silver.

7. The mass transfer system as recited in claim 5, wherein the interior surfaces of said chamber define a circular cross section.

8. The mass transfer system as recited in claim 7, wherein said chamber has a circular cross-section.

9. The mass transfer system as recited in claim 5, wherein said chamber has a square cross-section.

10. The mass transfer system as recited in claim 5, wherein said sections of superconductive material are formed from heat-treated powder.

11. The mass transfer system as recited in claim 10, wherein said coils are comprised of a metal selected from the group consisting of copper and silver.

12. The mass transfer system as recited in claim 11, wherein said metal is copper.

13. The mass transfer system as recited in claim 10, wherein said coils are comprised of magnet wire.

14. The mass transfer system as recited in claim 13, wherein said magnet wire has an AWG gauge of from about 20 to about 30.

15. The mass transfer system as recited in claim 14, wherein each of said electromagnetic coils is contiguous with at least one of said sections of superconductive material.

16. The mass transfer system as recited in claim 15, wherein at least one of said electromagnetic coils is contigous with at least two of said sections of superconductive material.

17. The mass transfer system as recited in claim 16, wherein said means for delivering asynchronous direct current pulses to said chamber is comprised of a power supply.

18. The mass transfer system as recited in claim 17, wherein said means for delivering asynchronous direct current pulses to said chamber is comprised of a power transistor.

19. The mass transfer system as recited in claim 18, wherein said means for delivering asynchronous direct current pulses to said chamber is comprised of a microprocessor.

20. The mass transfer system as recited in claim 5, wherein said superconductive material comprises at least one inorganic oxide.

* * * * *